(12) United States Patent
Massimo et al.

(10) Patent No.: US 6,772,641 B2
(45) Date of Patent: Aug. 10, 2004

(54) DIFFERENTIAL PRESSURE TRANSMITTER WITH SIMPLIFIED STRUCTURE AND REDUCED EDGE EFFECTS

(75) Inventors: Civetta Massimo, Musso (IT); Ballestriero Luca, Lenno (IT)

(73) Assignee: ABB Service S.r.l., Milan (IT)

( * ) Notice: Subject to any disclaimer, the term of this patent is extended or adjusted under 35 U.S.C. 154(b) by 0 days.

(21) Appl. No.: 10/253,540

(22) Filed: Sep. 25, 2002

(65) Prior Publication Data

US 2003/0056603 A1 Mar. 27, 2003

(30) Foreign Application Priority Data

Sep. 27, 2001 (IT) ..................................... MI2001A2012

(51) Int. Cl.⁷ ................................................. G01L 7/00
(52) U.S. Cl. ....................................................... 73/756
(58) Field of Search ........................... 73/715–727, 706, 73/756, 861.66; 137/112, 340, 343, 356, 385, 489, 552, 544–547, 608, 625.64, 798, 881, 884

(56) References Cited

U.S. PATENT DOCUMENTS

| | | | |
|---|---|---|---|
| 4,993,754 A | 2/1991 | Templin, Jr. | |
| 5,656,782 A | * 8/1997 | Powell et al. | .................. 73/756 |
| 5,668,322 A | * 9/1997 | Broden | .......................... 73/756 |
| 5,920,016 A | * 7/1999 | Broden | .......................... 73/756 |
| 5,988,203 A | 11/1999 | Hutton | |
| 6,079,443 A | 6/2000 | Hutton | |

* cited by examiner

Primary Examiner—William Oen
(74) Attorney, Agent, or Firm—Connolly Bove Lodge & Hutz LLP; Myron K. Wyche

(57) ABSTRACT

A differential pressure transmitter for sensing a physical variable related to a process fluid of an industrial system having a main body and a secondary body. The main body comprises a containment enclosure and a base that is associated with the containment enclosure. The secondary body comprises a first connection element that comprises a first coupling surface at which the secondary body is associated with the base of the main body. The secondary body comprises at least one second connection element that comprises a second coupling surface at which the second connection element is associated with the first connection element. The second connection element is rigidly connected to the first connection element to reduce edge effects on a separation membrane and to constitute a single mechanical structure together with said first connection element that is not separable into constituent parts of the first connection element and the second connection element.

14 Claims, 2 Drawing Sheets

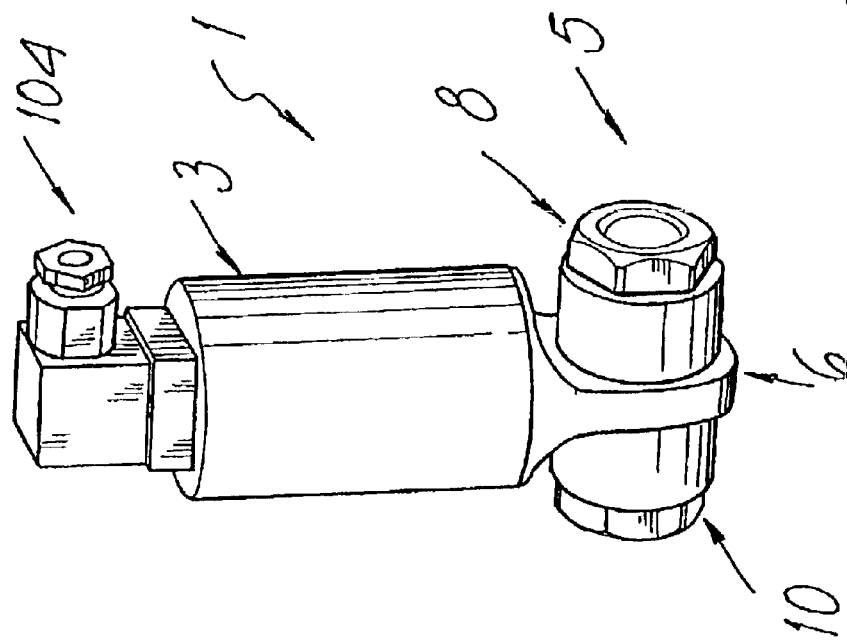
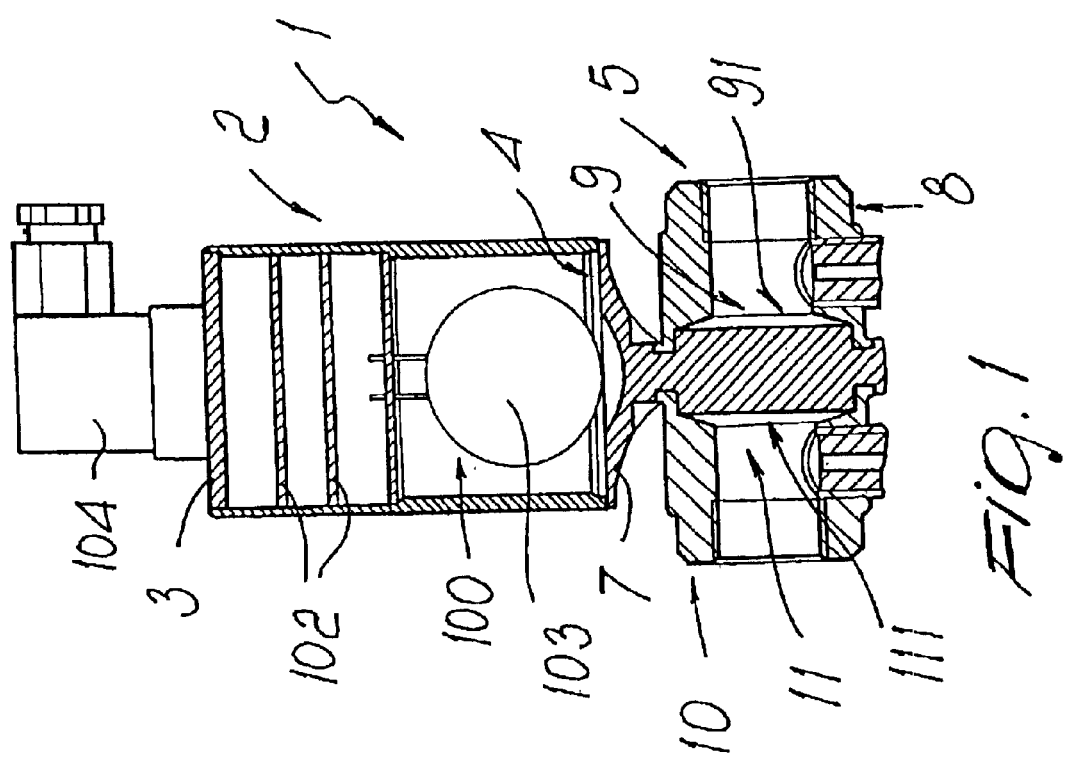

DIFFERENTIAL PRESSURE TRANSMITTER WITH SIMPLIFIED STRUCTURE AND REDUCED EDGE EFFECTS

FIELD OF THE INVENTION

The present invention relates to a differential pressure transmitter and, more particularly, to an improved differential pressure transmitter that has a simplified mechanical structure, is more reliable and sturdy, and has low manufacturing and installation costs.

BACKGROUND OF THE INVENTION

As known, pressure transmitters are widely used in industrial process control systems to sense one or more physical variables of a process fluid (pressure, flow, flow-rate, et cetera) by virtue of one or more differential measurements. Furthermore, a pressure transmitter allows to send to a remote monitoring device data/information related to the sensed physical variable.

Typically, a differential pressure transmitter is constituted by a main body that comprises an internal enclosure that includes a measurement chamber that accommodates a pressure transducer. A pressure sensor is usually used as a transducer, since it is well-known that it is possible to obtain easily, from one or more differential pressure measurements on the process fluid, by considering the appropriate boundary conditions, measurement values that relate also to other physical variables of interest (for example level, flow, turbulence and the like) that it would be more difficult to transduce directly.

In addition to said measurement chamber, the internal enclosure of the pressure transmitter accommodates primary electronic circuits, generally used to process the electronic signals that arrive from the pressure sensor. Generally, the main body of a conventional pressure transmitter also comprises an external enclosure that has protective and insulating functions. The external enclosure, in addition to fully enclosing the internal enclosure described above, accommodates some secondary electronic circuits meant to process the electronic signals that arrive from said primary electronic circuits and to handle communications with remote monitoring devices.

To perform the required sensing and measurement operations, the pressure transmitter must be placed in contact with the process fluid. For this purpose, a conventional differential pressure transmitter comprises one or more flanges that are coupled mechanically (by virtue of a screw/bolt system) to one or more manifolds that are suitable to convey the process fluid. Each flange is connected, by virtue of a further screw/bolt system, to the main body of the pressure transmitter, at at least one coupling surface, proximate to which a separation membrane is arranged. Typically, the separation membrane is arranged so as to have an outer wall that is exposed to the process fluid and an inner wall that is coupled hydraulically to the pressure sensor enclosed in the measurement chamber.

Known kinds of differential pressure transmitter have some drawbacks.

A first drawback arises from the fact that known transmitters have a relatively complicated mechanical structure that comprises, as mentioned, a plurality of containment enclosures that are mutually connected and connection flanges that are connected to the body of the transmitter by virtue of screws and bolts. A mechanical structure of this kind requires a relatively large number of operations for assembling the transmitter and for its installation in situ. This fact necessarily entails relatively high manufacturing and installation costs.

A second drawback that is certainly not secondary arises from the use of a system of screws and bolts to connect each flange to the main body of the transmitter.

Practice has in fact shown that if the bolts are not tightened very uniformly and with particular accuracy, mechanical stresses can arise at the separation membrane, these stresses being commonly called "edge effects". The intensity of these mechanical stresses is generally difficult to predict during design, since it depends on a plurality of factors, including asymmetries in the tightening of the connection bolts, uneven mechanical tolerances, ambient temperature variations, et cetera.

Experience has shown that so-called "edge effects" on the separation membrane can cause measurement errors on the part of the pressure transmitter, since pressure variations may occur between the separation membrane and the pressure sensor. Often the extent of these measurement errors is not at all negligible, in view of the high performance that is generally required of a transmitter, especially in terms of accuracy and stability in the long term. Therefore, in order to contain these measurement errors, the operations for assembling the transmitter are relatively complicated and laborious: this inevitably entails an increase in manufacturing times and costs. Moreover, when these measurement errors occur in a transmitter that has already been installed, it is often necessary to resort to extraordinary maintenance interventions, which are particularly expensive in terms of both time and cost.

SUMMARY OF THE INVENTION

The main aim of the present invention is to provide a differential pressure transmitter that allows to solve the drawbacks described for known types of transmitter. Within this aim an aspect of the present invention is to provide a differential pressure transmitter that has a simplified mechanical structure requiring a relatively small number of operations for assembling and installing the transmitter. Another aspect of the present invention is to provide a differential pressure transmitter that has a mechanical structure that allows to limit to negligible levels the onset of edge effects on the separation membranes.

Thus, the present invention provides a differential pressure transmitter for sensing a physical variable related to a process fluid of an industrial system, which comprises:
- a main body, which comprises a containment enclosure and a base that is associated with said containment enclosure; and
- a secondary body, which comprises a first connection element, said first connection element comprising a first coupling surface at which said secondary body is associated with the base of said main body;

wherein said secondary body comprises at least one second connection element that comprises a second coupling surface at which said second connection element is associated with said first connection element, said second connection element being rigidly connected to said first connection element so as to constitute a single integrated mechanical structure together with said first connection element.

For a better understanding of the present invention, reference is made to the accompanying drawings and to the detailed description hereinafter, in which preferred but non-limitative embodiments of the differential pressure transmitter according to the present invention are illustrated.

BRIEF DESCRIPTION OF THE DRAWINGS

In the drawings:

FIG. 1 is a schematic sectional view of a first embodiment of the transmitter according to the present invention;

FIG. 2 is a schematic perspective view of the pressure transmitter shown in FIG. 1;

DESCRIPTION OF THE PREFERRED EMBODIMENTS

Figure 4:
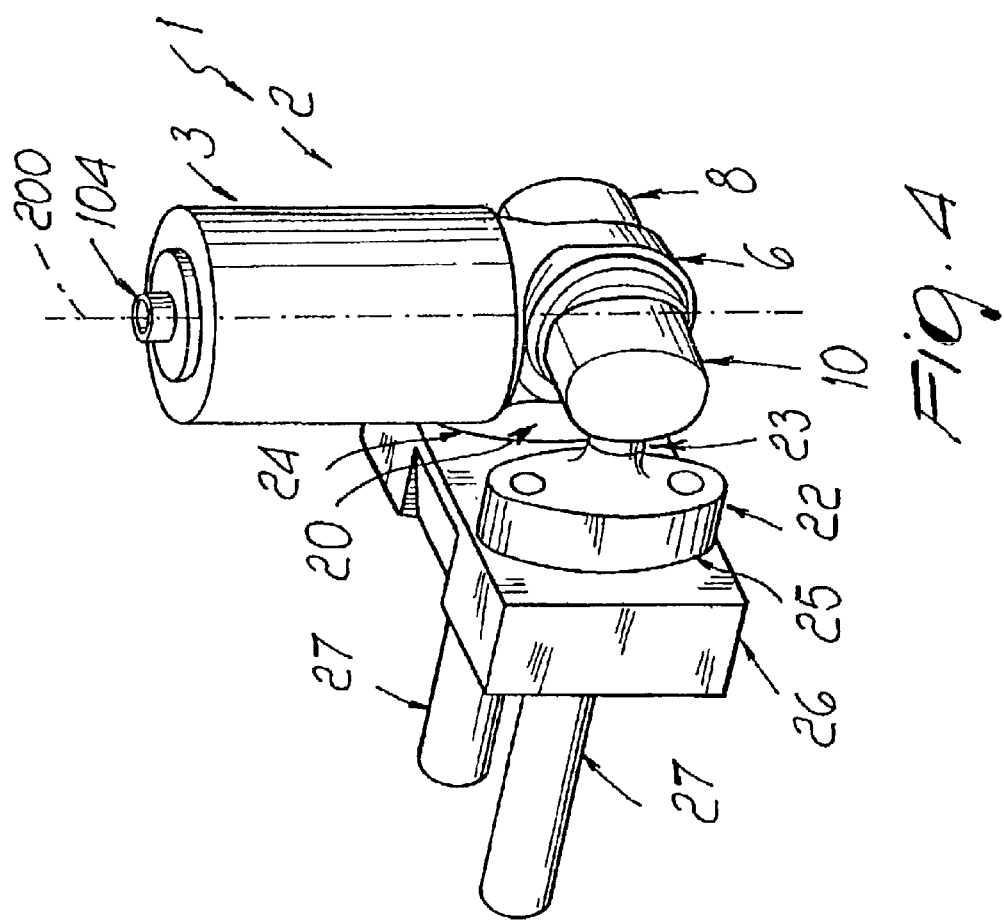
FIG. 4 is a schematic perspective view of a third embodiment of the transmitter according to the present invention.

With reference to the above figures, the differential pressure transmitter according to the present invention, generally designated by the reference numeral 1, is used to sense a physical variable related to a process fluid of an industrial system (both of which are not shown). The transmitter 1 comprises a main body 2 and a secondary body 5. The main body 2 comprises a containment enclosure 3 and a base 4 that is associated with the containment enclosure 3.

Advantageously, the main body 2 accommodates, inside the containment enclosure 3, a measurement chamber 100 that advantageously accommodates at least one pressure sensor 103. The pressure sensor 103 can be provided by means of technologies that are known in the background art, particularly by means of so-called "silicon micromachining" methods.

Preferably, the containment enclosure 3 also accommodates first electronic means 101, which are suitable to receive from the pressure sensor 103 first electronic signals (not shown) that represent the pressure of the process fluid. On the basis of said first electronic signals, the first electronic means 101 generate second electronic signals (not shown) that represent one or more physical variables related to the process fluid. Said second electronic signals are sent to second electronic means 102. The second electronic means 102 receive and process said second electronic signals and handle the communication of the pressure transmitter 1 with a remote monitoring device (not shown). For this purpose, the second electronic means 102 are advantageously connected to a communications network (for example of the 4–20 mA or Fieldbus type or the like), for example by means of a DIN 104 socket, and can make available on this network data/information obtained by processing the second electronic signals.

In a particularly advantageous embodiment of the present invention, the second electronic means 102 also are accommodated inside the containment enclosure 3. In particular, both the first electronic means 101 and the second electronic means 102 can be arranged on a single mechanical support.

As an alternative, as shown in FIG. 1, the first electronic means 101 and the second electronic means 102 can be arranged on multiple mechanical supports that are mutually rigidly coupled. These constructive solutions are particularly advantageous, since they allow to simplify drastically the mechanical structure of the main body 2. In the single containment enclosure 3 it is in fact possible to accommodate both the measurement chamber and the onboard electronics of the transmitter 1. This allows to simplify the operations for assembling the transmitter and also reduces its manufacturing costs.

The secondary body 5 is associated with the main body 2. The secondary body 5 has a first connection element 6, which comprises a first coupling surface 7. At the first coupling surface 7, the secondary body 5 is associated with the base 4 of the main body 2. In a preferred embodiment, the base 4 of the main body 2 can be connected to the secondary body 5 by virtue of a welding process (particularly a laser welding process).

The secondary body 5 furthermore comprises at least one second connection element 8, which is provided with a second coupling surface 9 at which the second connection element 8 is associated with the first connection element 6.

In a preferred embodiment, the secondary body 5 also comprises a third connection element 10, which is provided with a third coupling surface 11, at which the third connection element 10 is associated with the first connection element 6.

Advantageously, the first connection element 6 comprises a first separation membrane 91 and/or a second separation membrane 111, which are arranged respectively at the second coupling surface 9 and/or at the third coupling surface 11. Advantageously, the first separation membrane 91 and/or the second separation membrane 111 are arranged so that they have an outer wall (not shown) that is exposed to the process fluid and an inner wall (not shown) that is suitable to transmit the pressure of the process fluid.

First coupling means (not shown) and/or second coupling means (not shown) can be used to couple hydraulically the pressure sensor 103 respectively to the inner wall of the first membrane 91 and/or to the inner wall of the second membrane 111, so that the pressure of the process fluid is transmitted to the pressure sensor 103. The first coupling means and/or the second coupling means are advantageously accommodated within the first connection element 6 and within the containment enclosure 3. They can be provided advantageously according to known methods, for example by using ducts filled with a low-compressibility fluid (for example silicone oil).

The second connection element 8 is rigidly connected to the first connection element 6, so as to constitute, together with the first connection element 6, a single integrated mechanical structure. In practice, the first connection element 6 and the second connection element 8 are rigidly connected so as to constitute a single monolithic structure that cannot be separated into its parts. In a preferred embodiment, the first connection element 6 and the second connection element 8 can be rigidly connected by virtue of a welding process (preferably a laser welding process).

As an alternative, it is possible to use other known kinds of metallurgical process (for example melting, et cetera). Therefore, both the first connection element 6 and the second connection element 8 are an integral part of a single mechanical structure, the secondary body 5. The secondary body 5 can therefore be connected directly to the main body 2. In this manner it is possible to eliminate completely the operations for fixing flanges to the main body 2, as instead occurs in known types of transmitters.

Therefore, the number of operations required for the assembly of the transmitter is reduced drastically, with a consequent reduction of manufacturing times and costs. Moreover, owing to the fact that first connection element 6 and the second connection element 8 constitute, as a whole, a single integrated mechanical structure, it is possible to reduce to negligible levels the onset of edge effects on the separation membrane 91.

In a manner that is fully similar to what has been described above, the third connection element 10 can be rigidly connected (for example by means of a laser welding process or other metallurgical process) to the first connection element 6, so as to constitute a single integrated mechanical structure with the first connection element 6.

In order to couple the transmitter 1 to ducts 27 that convey the process fluid, the secondary body 5 can advantageously comprise at least one fourth connection element 20, which comprises a fourth coupling surface 21, at which the fourth connection element 20 is associated with the second connection element 8. Advantageously, the fourth connection element 20 is rigidly connected (for example by virtue of a laser welding process or other metallurgical process) to the second connection element 8, so as to constitute, together with the first connection element 8, a single integrated mechanical structure.

Likewise, the secondary body 5 can comprise a fifth connection element 22, which is provided with a fifth coupling surface 23 at which the fifth connection element 22 is associated with the fourth connection element 20. Advantageously, the fifth connection element 22 is rigidly connected (for example by virtue of a laser welding process or other metallurgical process) to the fourth connection element 20, so as to constitute, together with third connection element 10, a single integrated mechanical structure.

Preferably, a manifold 26 connected to the ducts 27 suitable to convey the process fluid can be associated with the fourth connection element 20 and with the fifth connection element 22. In this case, both the fourth connection element 20 and the fifth connection element 22 can have a flange-like structure, which comprises a sixth coupling surface 24 and/or a seventh coupling surface 25, at which the manifold 26 is associated respectively with the fourth connection element 20 and/or with the fifth connection element 22.

Figure 3:
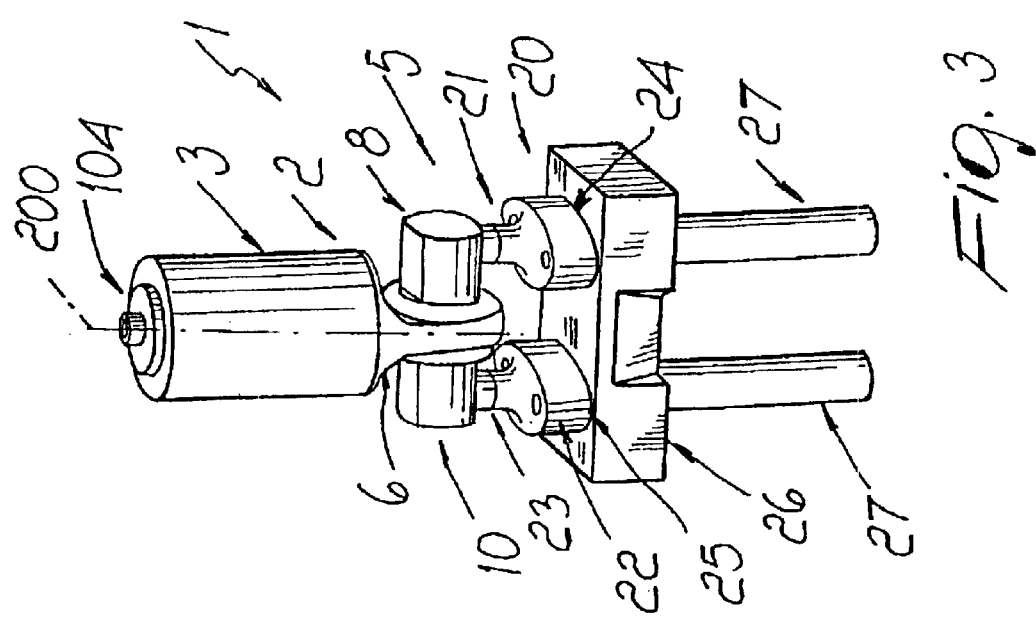
FIG. 3 is a schematic perspective view of a second embodiment of the transmitter according to the present invention.

The orientation of the connection of the pressure transmitter 1 to the manifold 26 can vary according to the requirements (as shown in FIGS. 3 and 4). Thus, for example, the coupling surfaces 24 and 25 can lie on planes that are substantially perpendicular (or, as an alternative, parallel) with respect to the main axis 200 of the pressure transmitter 1, as shown in FIG. 3 (or, as an alternative, in FIG. 4). Obviously, intermediate solutions (not shown) are possible. Therefore, the coupling surfaces 24 and 25 can lie on planes that have mutually different directions according to the requirements.

Advantageously, the second connection element 8 and the fourth connection element 20 comprise ducts (or at least a cavity) for the passage of the process fluid, which in this manner is free to make contact with the outer wall of the first membrane 91. Likewise, the third connection element 10 and the fourth connection element 22 comprise ducts (or at least a cavity) for the passage of the process fluid to the outer wall of the second membrane 111.

In practice it has been found that the pressure transmitter 1 according to the present invention allows to achieve the intended aim and objects. The transmitter 1 in fact has a highly simplified structure by virtue of the provision of the secondary body 5 as a monolithic unit that comprises at least the first connection element 6 and the second connection element 8 and/or the third connection element 10 and, if necessary, the fourth connection element 20 and/or the fifth connection element 22.

The simplification of the mechanical structure of the transmitter 1 is improved further by the use of a single containment enclosure 3 to accommodate the measurement chamber 100 and the onboard electronics (first electronic means 101 and second electronic means 102).

Furthermore, the provision of the secondary body 5 as a single integrated mechanical structure allows to limit to negligible levels the onset of edge effects on the separation membranes 91 and 111 exposed to the process fluid, ensuring a high-quality hydraulic coupling between the process fluid and the pressure sensor 103 enclosed in the measurement chamber of the transmitter 1. Therefore, any pressure variations between the separation membranes and the pressure sensor are reduced to negligible levels.

In this manner the reliability of the pressure transmitter 1 is improved considerably in terms of measurement accuracy and long-term stability. At the same time, an optimized mechanical structure such as the structure of the pressure transmitter 1 allows to reduce the operations for assembling and installing the transmitter, thus allowing to limit considerably its manufacturing, installation and maintenance costs.

We claim:

1. A differential pressure transmitter for sensing a physical variable related to a process fluid of an industrial system, comprising:

a main body, which comprises a containment enclosure and a base that is associated with said containment enclosure; and a secondary body, which comprises a first connection element, said first connection element comprising a first coupling surface at which said secondary body is associated with the base of said main body;

wherein said secondary body comprises at least one second connection element that comprises a second coupling surface at which said second connection element is associated with said first connection element, said second connection element being rigidly connected to said first connection element to reduce edge effects on a separation membrane and so as to constitute a single mechanical structure together with said first connection element that is not separable into constituent parts of the first connection element and the second connection element.

2. The differential pressure transmitter according to claim 1, wherein said second connection element is rigidly connected to said first connection element by virtue of a laser welding process or the like.

3. The differential pressure transmitter according to claim 1, wherein said secondary body further comprises at least one third connection element that comprises a third coupling surface at which said third connection element is associated with said first connection element, said third connection element being rigidly connected to said first connection element so as to constitute, together with said first connection element, a single mechanical structure that is not separable into constituent parts of the first connection element and the third connection element.

4. The differential pressure transmitter according to claim 3, wherein said third connection element is rigidly connected to said first connection element by virtue of a laser welding process or the like.

5. The pressure transmitter according to claim 3, wherein said secondary body further comprises at least one fourth connection element that comprises a fourth coupling surface, at which said fourth connection element is associated with said second connection element, said fourth connection element being rigidly connected to said second connection element so as to constitute, together with said first connection element, a single mechanical structure.

6. The differential pressure transmitter according to claim 5, wherein said secondary body further comprises a fifth connection element that comprises a fifth coupling surface, at which said fifth connection element is associated with said third connection element, said fifth connection element being rigidly associated with said third connection element so as to constitute, together with said third connection element, a single mechanical structure.

7. The differential pressure transmitter according to claim 5, wherein said fourth connection element is rigidly connected to said second connection element by virtue of a laser welding process or the like.

8. The differential pressure transmitter according to claim 6, wherein said fifth connection element is rigidly connected to said third connection element by virtue of a laser welding process or the like.

9. The pressure transmitter according to claim 6, wherein said fourth connection element and/or said fifth connection element respectively comprise a sixth coupling surface and/or a seventh coupling surface, at which a manifold is associated respectively with said fourth connection element and/or said fifth connection element.

10. The pressure transmitter according to claim 3, wherein said first connection element comprises a first separation membrane and/or a second separation membrane, which are arranged respectively at said second coupling surface and/or at said third coupling surface, said first separation membrane and/or said second separation membrane comprising an outer wall, which is exposed to said process fluid, and an inner wall, which is suitable to transmit the pressure of said process fluid.

11. The pressure transmitter according claim 10, which further comprises:
   a measurement chamber, which comprises at least one pressure sensor and is accommodated inside the containment enclosure of said main body; and first coupling means and/or second coupling means for mechanically coupling said pressure sensor respectively to the inner wall of said first separation membrane and/or to the outer wall of said second separation membrane, so that the pressure of said process fluid is transmitted to said pressure sensor; and first electronic means that are suitable to receive front said pressure sensor first electronic signals, which represent the pressure of said process fluid, and to generate, on the basis of said first electronic signals, second electronic signals that represent one or more physical variables related to said process fluid, said first electronic means being accommodated inside the containment enclosure of said main body.

12. The pressure transmitter according to claim 11, further comprising second electronic means that are suitable to receive and process said second electronic signals and to handle the communication of said pressure transmitter with a remote monitoring and/or measurement device, wherein said second electronic means are accommodated inside the containment enclosure of said main body.

13. The pressure transmitter according to claim 12, wherein said first electronic means and said second electronic means are arranged on a single mechanical support that is accommodated inside the containment enclosure of said main body.

14. The pressure transmitter according to claim 12, wherein said first electronic means and said second electronic means are arranged on multiple mechanical supports that are rigidly connected to each other and are accommodated inside the containment enclosure of said main body.

* * * * *